Patented May 11, 1937

2,079,976

UNITED STATES PATENT OFFICE 2,079,976

PRODUCTION OF ACETALDEHYDE FROM ACETYLENE

Frederic van Taack-Trakranen and Gustav Wietzel, Mannheim, Germany, assignors to I. G. Farbenindustrie Aktiengesellschaft, Frankfort-on-the-Main, Germany No Drawing. Application October 1, 1935, Serial No. 43,056. In Germany October 11, 1934

1 Claim. (Cl. 260—139)

The present invention relates to an improved process for the production of acetaldehyde from acetylene.

It has already been proposed to prepare acetaldehyde by the hydration of acetylene by means of sulphuric acid solutions of mercury salts. When employing the method based on this principle for the hydration of acetylene contained in great dilution in gas mixtures containing hydrogen, as for example when working up a gas mixture, obtained in the electric arc from methane or cracking gases and containing mainly hydrogen apart from about 5 to 20 per cent of acetylene and other unsaturated hydrocarbons, the consumption of mercury salts is a multiple of the amount which is necessary for working up pure acetylene.

This increased consumption of mercury salt, as has been established by thorough investigation, is due to the fact that the mercuric sulphate in the catalytic solution is reduced to mercurous sulphate. The latter is difficultly soluble and is therefore precipitated even when a comparatively low concentration is exceeded. Contrasted with dissolved mercurous sulphate, which only reacts slowly with the aldehyde formed in the catalytic solution, solid mercurous sulphate reacts fairly rapidly with the aldehyde and is thus itself reduced to a grey sludge of metallic mercury.

We have now found that the said two-fold disadvantage, namely on the one hand the destruction of the catalytically active mercury salt and on the other hand the formation of undesirable oxidation products from the acetaldehyde which injuriously affects the yield of aldehyde, can be avoided to a great extent by hindering the separation of solid mercurous sulphate from the catalytic solution by keeping the concentration of the mercury salt in the sulphuric acid solution so low that only between 0.3 and 3 grams of mercury (corresponding to about 0.45 to 4.5 grams of mercuric sulphate) are contained in each litre.

The following example shows that an extremely far-reaching conversion of the acetylene contained in the gas mixture poor in acetylene is obtained in spite of the low concentration of mercury salt, but the invention is not restricted to this example.

Example 50 liters per hour of a gas mixture containing 14 per cent of acetylene, 1 per cent of unsaturated hydrocarbons, 15 per cent of methane and 70 per cent of hydrogen are led at 95° C. into a solution of 100 cubic centimeters of concentrated sulphuric acid and 1 gram of mercury (corresponding to about 1.5 grams of mercuric sulphate) in 1 litre of water. A fine dispersion of the gas is ensured by the use of a fine-pored sinter plate.

The acetylene, by one passage through the catalytic solution, is converted to the extent of more than 96 per cent. In order to maintain the said concentration of mercury, from 0.6 to 0.8 gram of mercuric oxide must be added per hour.

If, on the other hand, there is employed instead of the said mercury salt solution under exactly the same conditions a solution containing 4 grams of mercury (corresponding to about 6 grams of mercuric sulphate) instead of 1 gram of mercury, then with the same high conversion of the acetylene, 4 grams of mercuric oxide must be added per hour for the maintenance of the mercury concentration of the catalytic solution at 4 grams per liter.

What we claim is:

In the catalytic production of acetaldehyde from a gas consisting mainly of hydrogen and containing from about 5 to 20 per cent of acetylene by means of a dilute sulfuric acid solution containing mercuric sulfate the step which consists in keeping the concentration of the mercuric sulfate in the said solution so low that only between 0.3 and 3 grams of mercury are contained in each litre of the solution.

FREDERIC van TAACK-TRAKRANEN.
GUSTAV WIETZEL.